United States Patent
Herava

(10) Patent No.: US 6,526,729 B1
(45) Date of Patent: Mar. 4, 2003

(54) METHOD FOR TREATING PLASTIC FILM AND A DEVICE IN A WRAPPING MACHINE

(75) Inventor: Ismo Herava, Naantali (FI)

(73) Assignee: United Packaging PLC, West Yorkshire (GB)

( * ) Notice: Subject to any disclaimer, the term of this patent is extended or adjusted under 35 U.S.C. 154(b) by 0 days.

(21) Appl. No.: 09/529,111

(22) PCT Filed: Mar. 30, 1998

(86) PCT No.: PCT/FI98/00285

§ 371 (c)(1),
(2), (4) Date: Apr. 7, 2000

(87) PCT Pub. No.: WO99/19216

PCT Pub. Date: Apr. 22, 1999

(30) Foreign Application Priority Data

Oct. 9, 1997 (FI) .................................................. 973923
Mar. 27, 1998 (FI) .................................................. 980709

(51) Int. Cl.⁷ .............................................. B65B 11/00
(52) U.S. Cl. ...................... 53/465; 53/463; 53/375.9; 53/587; 53/588; 53/477; 53/DIG. 2
(58) Field of Search .................... 53/427, 435, 461, 53/463, 465–477, 587, 588, 589, 375.9, 204, 210, 211, 218, DIG. 2; 156/380.9

(56) References Cited

U.S. PATENT DOCUMENTS

| | | | | |
|---|---|---|---|---|
| 3,383,265 A | * | 5/1968 | Garabedian | 156/380.9 |
| 3,549,451 A | * | 12/1970 | Kugler | 156/380.9 |
| 3,830,365 A | * | 8/1974 | Krueger et al. | 53/427 |
| 3,997,385 A | * | 12/1976 | Osborne | 156/380.9 |
| 4,077,179 A | * | 3/1978 | Lancaster et al. | 53/556 |
| 4,220,847 A | * | 9/1980 | Focke et al. | 53/375.9 |
| 4,906,320 A | * | 3/1990 | Powers | 156/380.9 |
| 4,969,969 A | * | 11/1990 | Powers | 156/380.9 |
| 5,151,149 A | * | 9/1992 | Swartz | 156/380.9 |
| 5,430,995 A | * | 7/1995 | Cere | 53/375.9 |
| 5,444,814 A | * | 8/1995 | Hofius, Sr. | 156/380.9 |
| 5,450,711 A | * | 9/1995 | Martin-Cocher | 53/556 |
| 6,270,599 B1 | * | 8/2001 | Wood | 156/380.9 |

* cited by examiner

Primary Examiner—John Sipos
Assistant Examiner—Louis Huynh
(74) Attorney, Agent, or Firm—Kubovcik & Kubovcik

(57) ABSTRACT

A method and device for treating plastic film, according to which method plastic film web used as packaging material is wrapped around the object to be packaged. According to the method, the plastic film layers are seamed together and the plastic film web is cut off by heating the seaming point and cutting-off point by means of a heat radiator. Heat-absorbent counterpieces are preferably placed at both the seaming point and the cutting-off point, the said counterpieces being heated through the plastic layers. When the counterpieces absorb heat from the heating radiator, they heat up and at the same time heat the plastic films to be seamed and cut off. In the most advantageous embodiment, the infrared heat radiator is placed inside a tubular gripping counterpiece, which gripping counterpiece comprises slots through which the heat radiation is able to pass to the counterpieces. The color and degree of darkness of the counterpieces has been selected such that they bring about the desired temperatures in the plastic films.

41 Claims, 15 Drawing Sheets

METHOD FOR TREATING PLASTIC FILM AND A DEVICE IN A WRAPPING MACHINE

FIELD OF THE INVENTION

The object of the invention is a method for treating plastic film in packaging by wrapping, according to which method plastic film web used as packaging material is wrapped around the object to be packaged, the said web being treated thermally to seam the plastic films and/or to cut off the plastic film web. In the packaging sector, a widely used packaging method is one where the object to be packaged is wrapped inside a thin plastic film. The plastic film used in such a case is usually plastic film web which is unwound from a roll and wrapped around the object to be packaged.

The object of the invention also includes a device in a plastic film wrapping machine, which comprises wrapping means for wrapping the plastic film around the object to be packaged, and treatment means for thermally treating the plastic film, the said treatment means comprising a seaming device for seaming the plastic films and/or a cutting device for cutting off the plastic film web. Thus the method and device are applicable to a wide range of packaging machines. There are manual, semi-automatic and fully automatic wrapping machines.

DESCRIPTION OF THE PRIOR ART

Manual wrapping machines are usually turntable machines in which only the object to be packaged is rotated by means of a motor. Other functions, such as moving the object, start of wrapping, lifting and lowering the plastic film roll carriage, seaming, cutting and finishing of wrapping are all carried out manually. There are also manual rotary arm wrapping machines, in which the plastic film roll is rotated around the object to be packaged by means of an arm.

Semi-automatic packaging machines are usually also turntable machines or rotary arm wrapping machines. In these machines, the object to be packaged has to be moved to the wrapping station and away from it separately. These machines also lack automatic plastic film seaming or automatic plastic film web cutting.

In a fully automatic packaging machine, the object to be packaged is moved and the package handled automatically. The pallet on which the object to be packaged Is placed is fed into the wrapping machine by means of a conveyor, the object is wrapped in plastic film, the plastic film is seamed, the plastic film is cut off and the packaged object is conveyed away from the wrapping machine. All this takes place automatically. The handling of the next object to be packaged also starts automatically, in the same manner. With a fully automatic packaging machine, human intervention is usually only needed when the roll of plastic packaging film runs out. Someone is then needed to change the empty roll for a full one. Fully automatic plastic film wrapping machines are usually ring wrapping machines, turntable machines or rotary arm wrapping machines. Ring wrapping machines are generally always fully automatic.

The method and device relating to the invention can be applied to any of the above mentioned packaging machine types. The greatest advantages are, however, achieved with a fully automatic packaging machine, the efficiency of its operation increasing substantially as a result of the method and device relating to the invention. This is why the invention is described in the following, by way of an example, when connected to an automatic ring wrapping machine. It is, however, obvious that this only serves as an example, which does not restrict the use of the invention in other packaging machines.

A known plastic film packaging machine is the type of ring wrapping machine in which a roll containing plastic packaging film is placed in a wrapping carriage positioned in a circular rotation ring. The object to be packaged is placed in the centre of the circular rotation ring. Packaging takes place so that the rotation ring with its wrapping carriage rotates around the object to be wrapped, thus unwinding the plastic packaging film from the roll and winding it around the object to be packaged. Alternatively, the object to be packaged may rotate and the plastic film web be unwound from a plastic film roll moving vertically, which is the case with turntable wrapping machines.

On a known ring wrapping machine, when packaging is started, the end of the plastic film web unwinding from the roll is fastened to the grip of the gripping unit incorporated in the packaging machine. By means of the gripping means, the leading end of the plastic film web is held in place when wrapping is started. In this machine, the gripping means is positioned on the frame of the packaging machine in such a way that it will not rotate with the rotation ring. When at least one round of wrapping film web has been wrapped around the object to be packaged, the end of the plastic film web is detached from the hold of the grip. The detached end of the plastic film web then falls on top of the already wound layer of plastic film web and remains under the next plastic film layers which are wound over it. Since the surface of the plastic film web is sufficiently tacky, the layers of the package which are on top of each other will not slide but remain firmly in place.

In a ring wrapping machine, packaging is stopped when a sufficient amount of plastic film web has been wound around the object to be packaged, by seaming the plastic film web and cutting its end off. When seaming takes place, at least the two topmost web layers are seamed together and the web is cut adjacent to the seam. Seaming is usually done so that once the actual wrapping has been completed, the seaming counterpiece of the seaming device is placed above the plastic films of the package, at a distance from the topmost plastic film. After this, another one or two layers of plastic film are wrapped around the package, thus leaving the seaming counterpiece under these layers. The actual seaming takes place by bringing several band-like thermal resistors heated to a suitable temperature to the position of the seaming counterpiece, and pressing the said resistors momentarily against the seaming counterpiece. As a result, the seaming layers of the plastic film web are pressed between the seaming counterpiece and the thermal resistors, which causes the plastic films of the seaming layers to melt and adhere to each other at the points where the thermal resistors are located.

In a known ring wrapping machine, the thermal resistor bands used in seaming are usually parallel with the plastic film web, thus forming several adjacent seams having the same length as the resistor bands. The thermal resistor bands are parallel with the plastic film web because cross-web thermal resistors might melt and cut the plastic film web when seaming takes place. When the thermal resistor is moved away from the vicinity of the seam, the seam cools rapidly and the seaming counterpiece can be pulled away from between the packaging plastic layers.

Before the plastic film web is cut off, the gripping means of the gripping unit incorporated in the machine grips the plastic film web in the vicinity of the cutting-off point so that the end unwinding from the roll, which remains free, can be taken close to the next object to be packaged in order to start its packaging. The plastic film web is cut off adjacent to the seam by bringing a thermal resistor wire close to the plastic film web running from the package to the roll. When the thermal resistor wire is heated, the plastic web also heats up to such an extent that it is cut off by melting. After this, the wrapping plastic film package is complete.

Once the packaged object has been removed from the packaging machine and a new object has been brought in its place, the packaging of the next object is started by bringing the end of the plastic film web, by means of the grip, close to the object to be packaged and proceeding with the wrapping as described above.

SUMMARY OF THE INVENTION

The aim of the present invention is to increase the efficiency of operation of the plastic film packaging machine disclosed above and to achieve a new method and device for finishing off the plastic packaging film once the desired number of plastic film web layers have been wrapped around the object to be packaged.

It is characteristic of the method relating to the invention that in packaging by wrapping, plastic film is treated, so that one or more plastic film webs are heated by means of at least one heat radiator in order to seam the plastic film webs together and/or to cut off the plastic film web.

According to an advantageous embodiment, two or more plastic film webs are seamed together in such a way that a heat-absorbent counterpiece is placed under the plastic film layers at the seaming point, the said counterpiece being heated by means of an infrared heat radiator through the plastic film layers, and that the counterpiece is allowed to absorb the heat from the infrared heat radiator so that it heats up and at the same time heats the plastic film layers to be seamed in such a way that the plastic film layers are seamed together.

According to another advantageous embodiment, the plastic film web (22) is cut off in such a way that a heat-absorbent counterpiece is placed behind the plastic film web at the cutting-off point, the said counterpiece being heated by means of an infrared heat radiator through the plastic film web, and that the counterpiece is allowed to absorb the heat from the infrared heat radiator so that it heats up and at the same time heats the plastic film web to be cut off so that the plastic film web is cut off.

It is characteristic of the device relating to the invention that the plastic film wrapping machine comprises at least one heat radiator by means of which one or more plastic film webs can be heated in order to seam them together and/or the plastic film wrapping machine comprises at least one heat radiator by means of which the plastic film web can be heated in order to cut it off.

According to an advantageous embodiment of the device relating to the invention, the seaming device comprises an infrared heat radiator and at least one heat-absorbent counterpiece, and means for placing the infrared heat radiator and the heat-absorbent counterpiece on opposite sides of the plastic film layers to be seamed.

According to another advantageous embodiment of the device, the cutting device comprises an infrared heat radiator and at least one heat-absorbent counterpiece, and means for placing the infrared heat radiator and the heat-absorbent counterpiece on opposite sides of the plastic film layers to be cut off.

The invention enables both more rapid seaming and cutting and at the same time improved reliability and appearance of the seam. According to yet another advantageous embodiment, the infrared heat radiator is placed inside a tubular gripping counterpiece, the said gripping counterpiece having slots or apertures through which the heat radiation is able to pass to the counterpieces.

BRIEF DESCRIPTION OF THE DRAWINGS

The invention is described in the following by means of an example, with reference to the appended drawings in which.

DETAILED DESCRIPTION OF THE DRAWINGS

Figure 1:
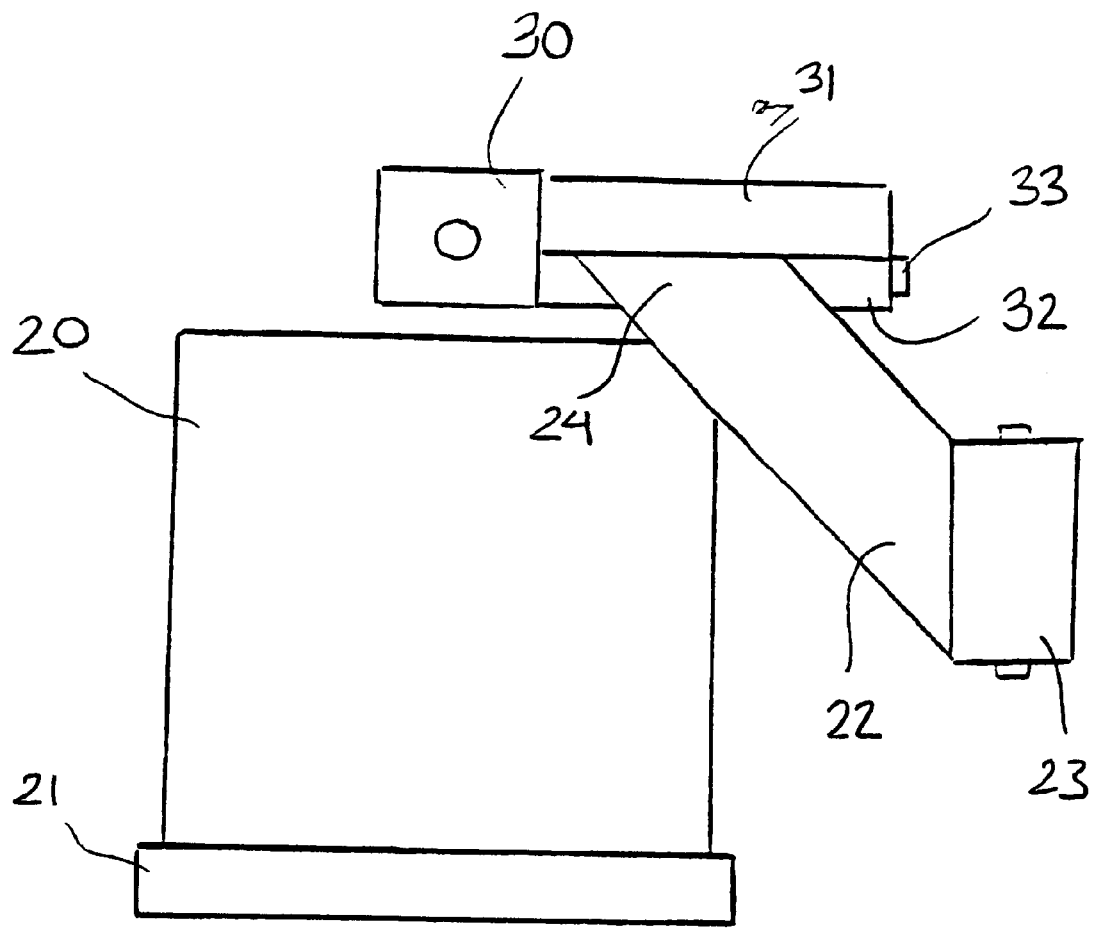
FIG. 1 shows a diagrammatic side view of the plastic film wrapping machine and the object to be packaged at the start of packaging.

FIG. 1 shows diagrammatically the object 20 to be packaged placed on base 21, and the film roll 23 containing the plastic film web 22 used for packaging. The film roll 23 is placed in a wrapping carriage which moves on a circular rotation ring. The carriage is not shown. Of the actual packaging machine, the figure only shows the gripping unit 30, between the gripping counterpiece 31 and gripping arm 32 of which is fastened the end 24 of the plastic film web 22. FIG. 1 also shows the seaming counterpiece 33 situated on the gripping unit.

The wrapping of a package is started by manually fastening the end 24 of the plastic film web 22 unwinding from the film roll 23 between the gripping counterpiece 31 and the gripping arm 32 of the gripping unit 30. This has to be done every time the film roll 23 runs out or is replaced for some other reason. At the other stages, the plastic film 22 does not need to be touched by hand, because when the film is cut, the gripping counterpiece 31 and gripping arm 32 of the gripping unit 30 always grip that end of the film web 22 to be cut which remains on the side of the film roll 23, as seen from the cutting-off point. This enables automatic package wrapping even if the object to bet packaged 20 is changed. This can be continued until the film roll 23 runs out and is then replaced with a new full one. When wrapping starts, the gripping counterpiece 31 and gripping arm 32 of the gripping unit 30, and the seaming counterpiece 33, are in their uppermost position and the end 24 of the plastic film 22 is between the gripping counterpiece 31 and the gripping arm 32. The film roll 23 is placed in a wrapping carriage which moves on a circular rotation ring, from which carriage the film 22 unwinds automatically. The rotation ring and wrapping carriage are not shown in FIG. 1.

Figure 2:
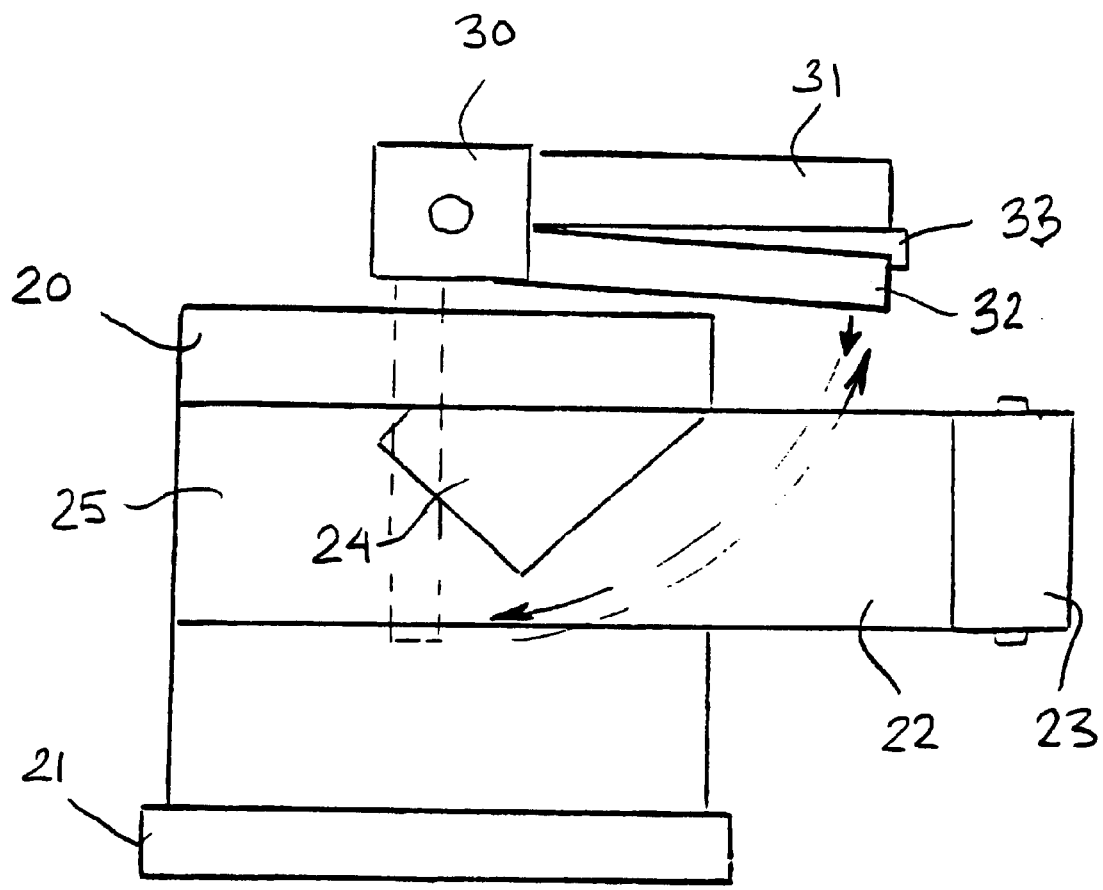
FIG. 2 corresponds to FIG. 1 and shows the second stage of packaging.

FIG. 2 shows the second stage of packaging by wrapping in which the end 24 of the plastic film 22 is detached from the gripping unit 30 after the first full wrapping round. The gripping unit 30 is opened by turning and opening the gripping arm 32. The detaching movement of the gripping arm 32 is about 90°, during which the gripping arm 32 moves to the lower position and returns back up. The purpose of the movement is to ensure that the plastic film is actually detached from the gripping unit 30. As a result of being detached, the end 24 of the plastic film 22 falls down on top of the first layer of wrapping 25. When the next round of plastic film is then wound, the end 24 of the film 22 remains under the second film layer. Thus the end 24 of the film 22 is fastened tightly between the first and second film layers.

After the first rounds, wrapping is continued by wrapping the desired number of packaging film layers around the object to be packaged. On top of these layers are then added so-called seaming rounds, the purpose of which is to achieve a sufficiently thick seaming layer to obtain reliable seaming.

Figure 3:
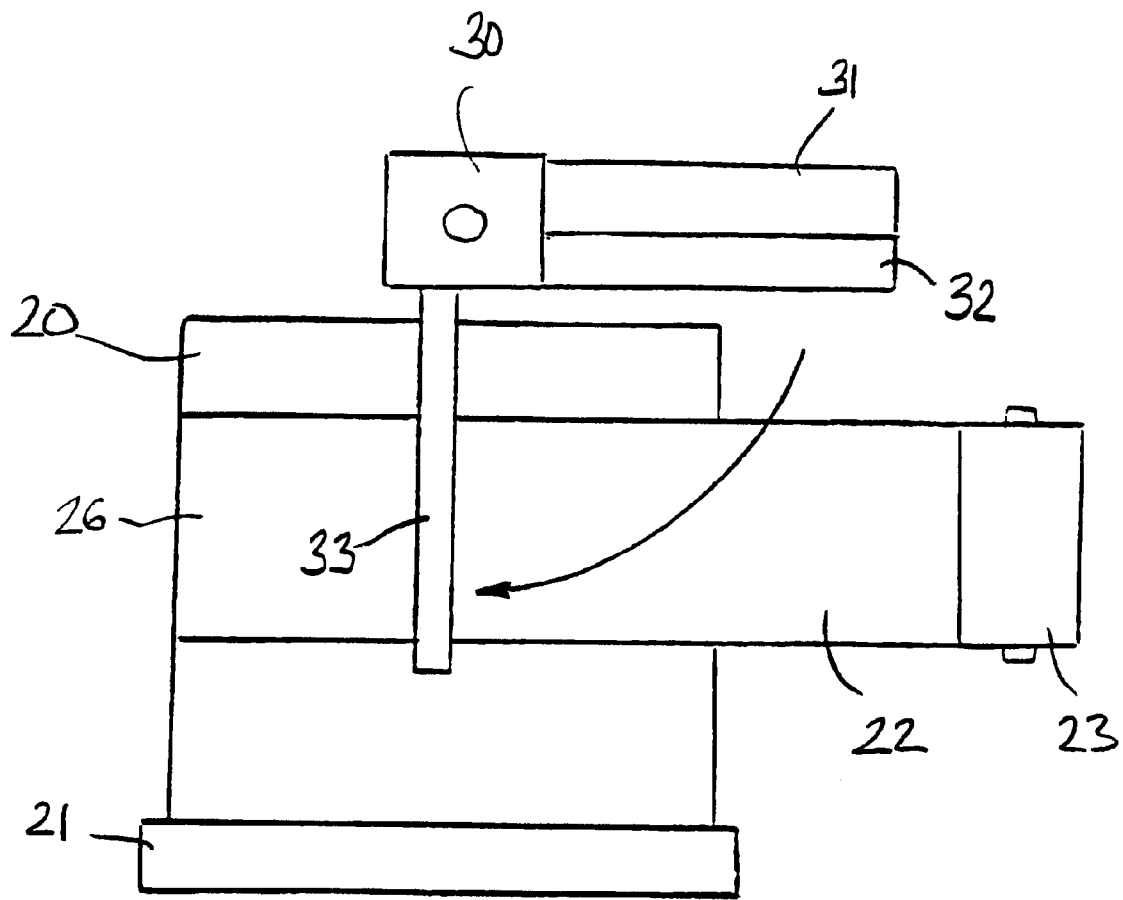
FIG. 3 corresponds to FIG. 1 and shows the start of package seaming FIG. corresponds to FIG. 3 and shows the second stage of package seaming.
Figure 4:
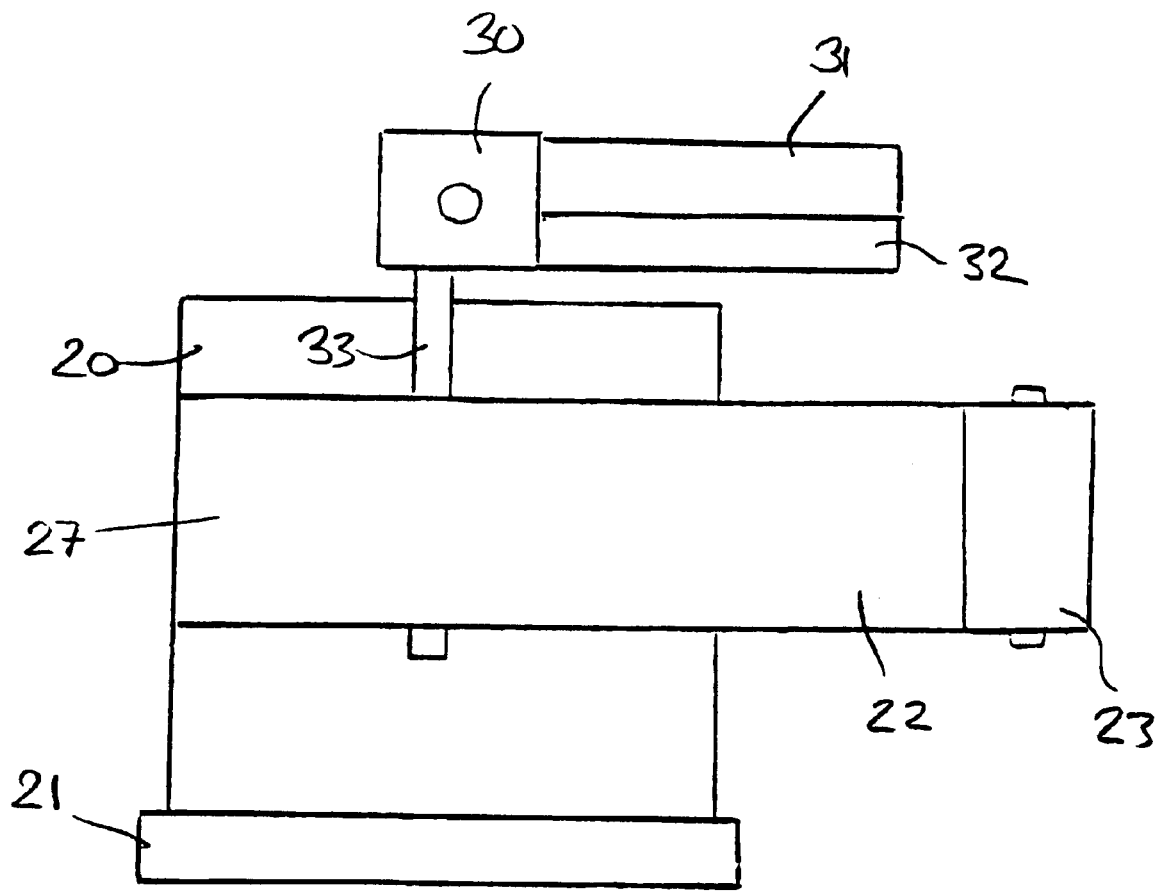

FIG. 3 shows the start of package seaming, where, immediately following the last package wrapping round 26, the seaming counterpiece 33 is lowered down on top of the packaging film layers, at a distance from the topmost plastic packaging film. As a result, the next layer, that is, the first plastic film 22 seaming layer 27 is wound over the seaming counterpiece 33, as shown in FIG. 4.

Figure 5:
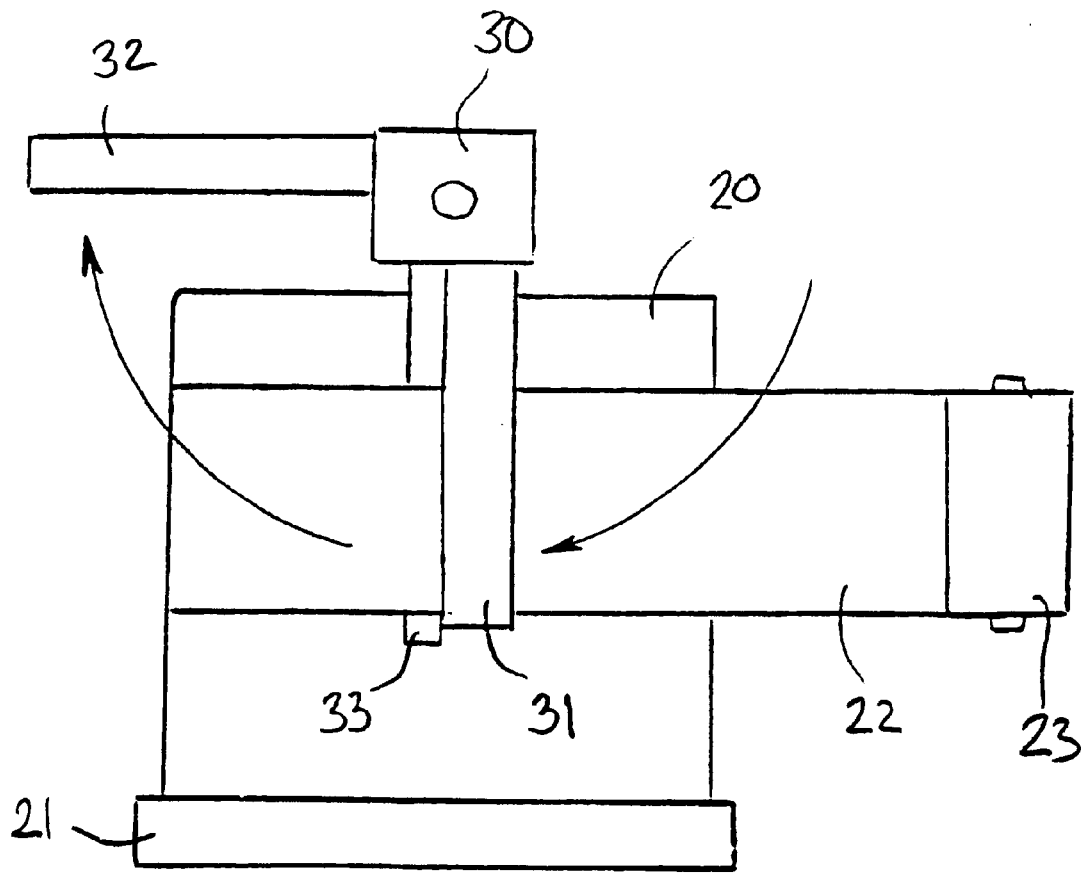
FIG. 5 corresponds to FIG. 3 and shows the third stage of package seaming.

Immediately after the first seaming round 27 of the plastic film 22, the gripping arm 32 and the gripping counterpiece 31 are lowered down together. The gripping arm 32 is, however, turned back up again, but this time to the opposite side. This situation is shown in FIG. 5.

Figure 6:
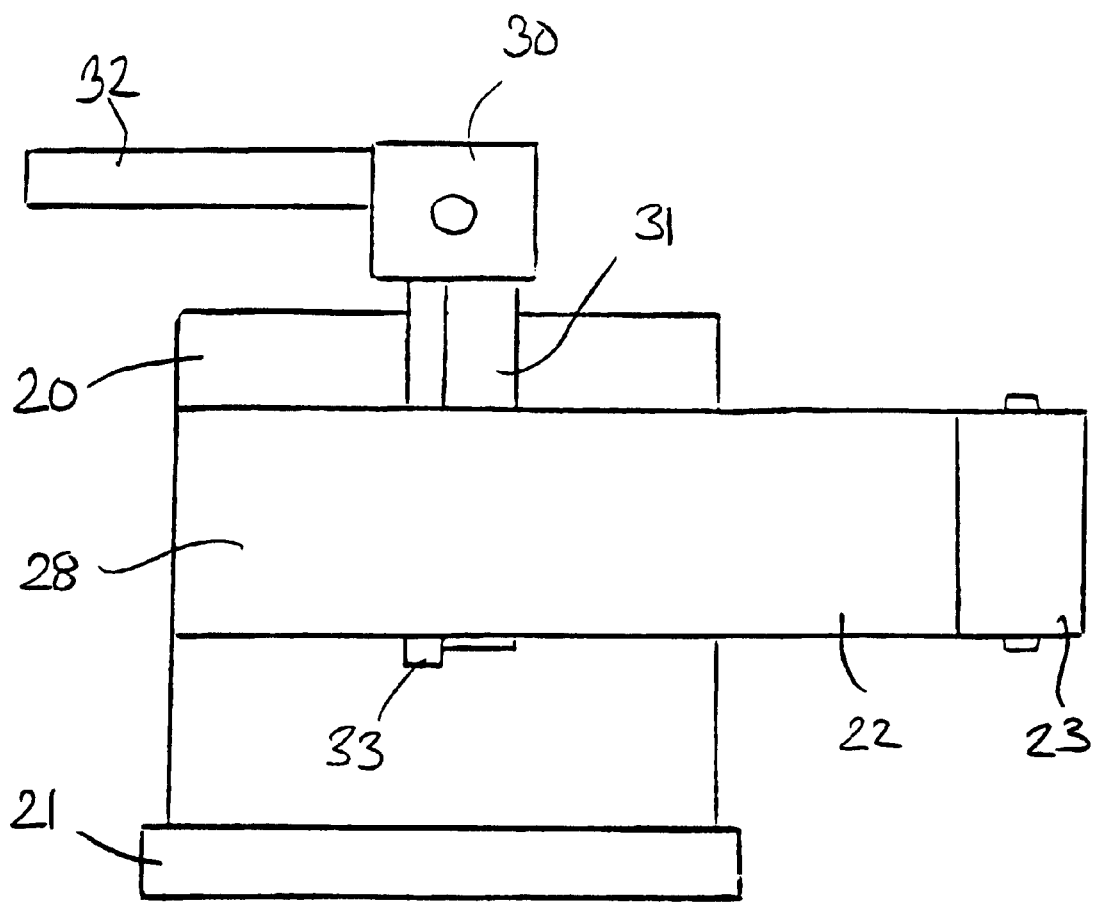
FIG. 6 corresponds to FIG. 3 and shows the fourth stage of package seaming.
Figure 7:
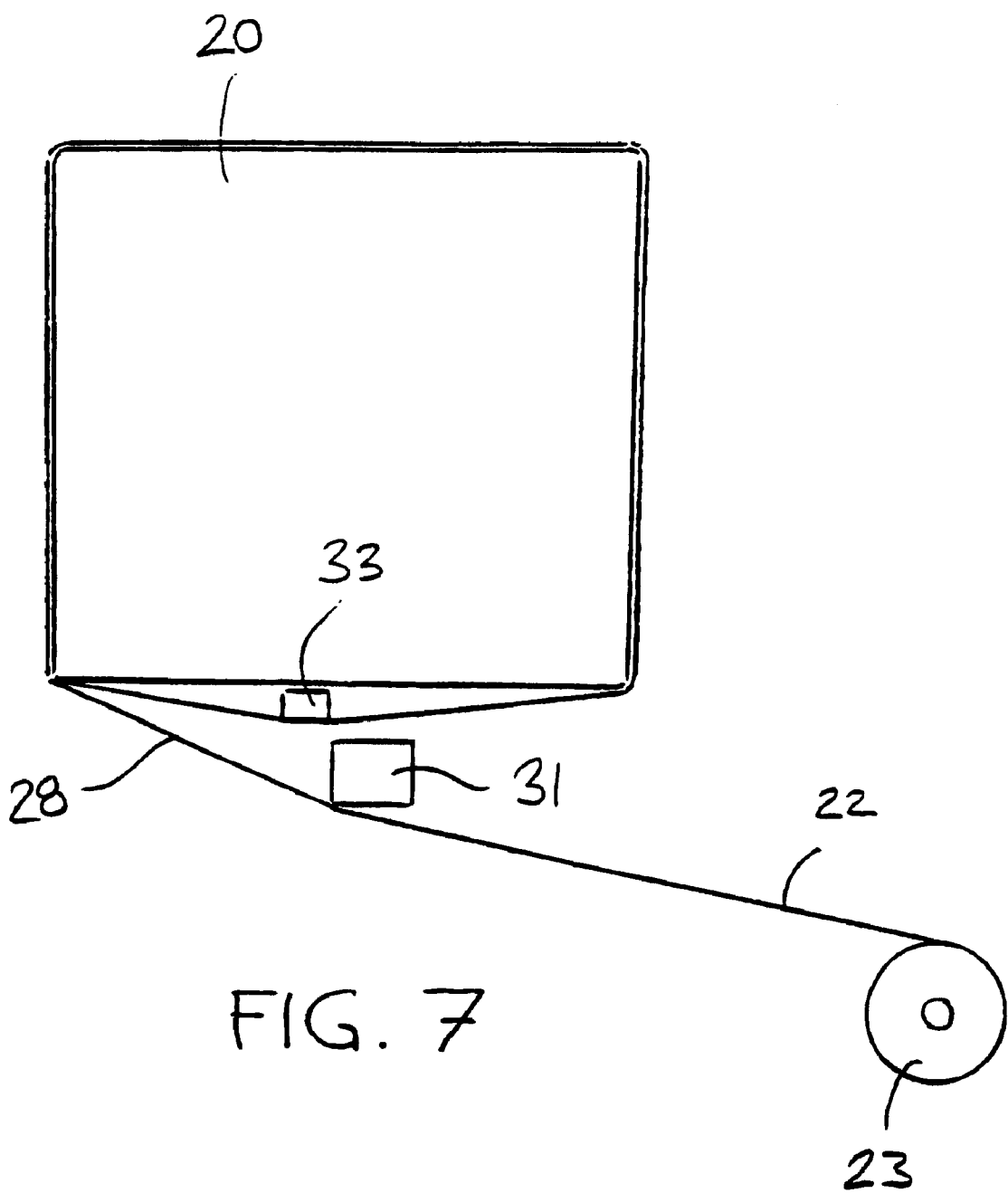
FIG. 7 shows a diagrammatic view of the plastic film wrapping machine of FIG. 1 and the object to be packaged in the situation shown in FIG. 6, as seen from above.

In the next wrapping round, that is, the second seaming round, the plastic film 22 passes under the gripping arm 32 and the second seaming layer 28 is wrapped over the gripping counterpiece 31. The situation is shown in FIG. 6 as seen from the side, and in FIG. 7 as seen from above.

Figure 8:
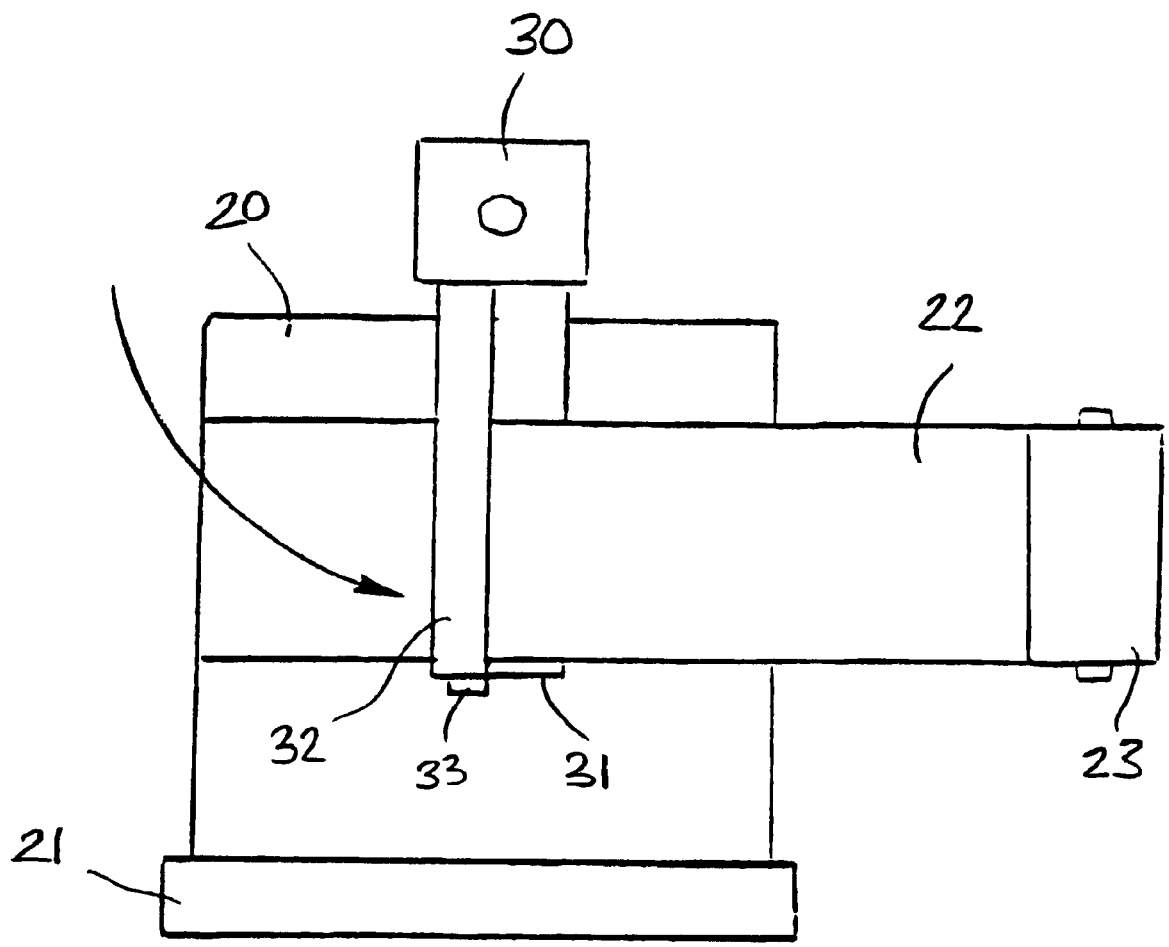
FIG. 8 corresponds to FIG. 3 and shows the fifth stage of package seaming.
Figure 9:
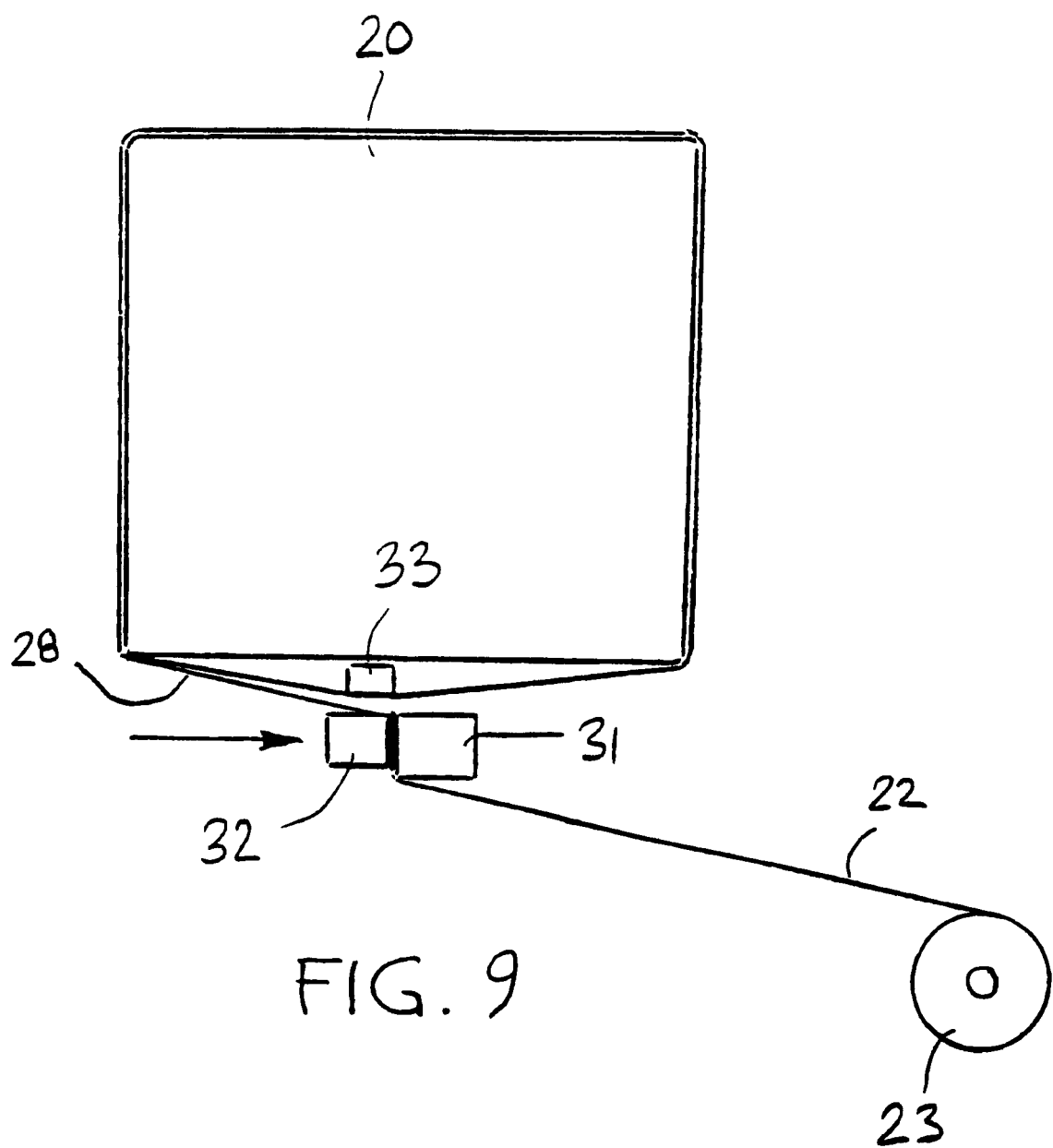
FIG. 9 corresponds to FIG. 7 in the situation shown in FIG. 8.

When the plastic film 22 comes into contact with the gripping counterpiece 31 during the second seaming round, the wrapping carriage is stopped and the plastic film 22 feed is discontinued. After this, the gripping arm 32 is turned back down again, towards the gripping counterpiece 31, so that the plastic film 22 remains pinched between the gripping arm 32 and the gripping counterpiece 31, as shown from the side in FIG. 8, and from above in FIG. 9.

Figure 10:
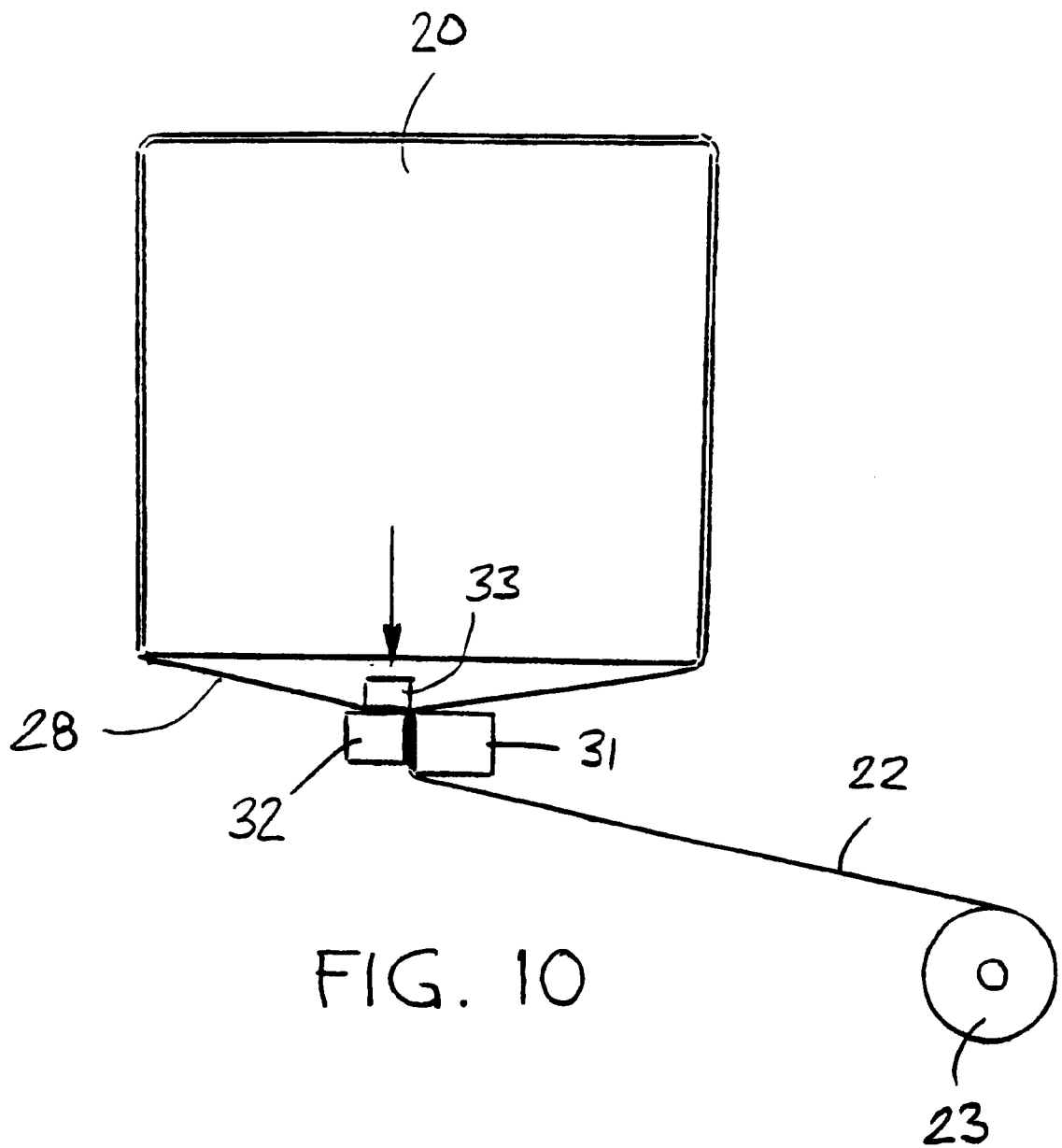
FIG. 10 corresponds to FIG. 7 and shows the sixth stage of package seaming.

For the purpose of seaming, the seaming counterpiece 33 or a separate seaming surface belonging to it, is pressed against the gripping arm 32, as shown in FIG. 10. As a result, the two topmost plastic film layers are pressed between the seaming counterpiece 33 and the gripping arm 32. This is followed by seaming and cutting off of the plastic, film 22, as shown in greater detail in FIG. 11.

Figure 11:
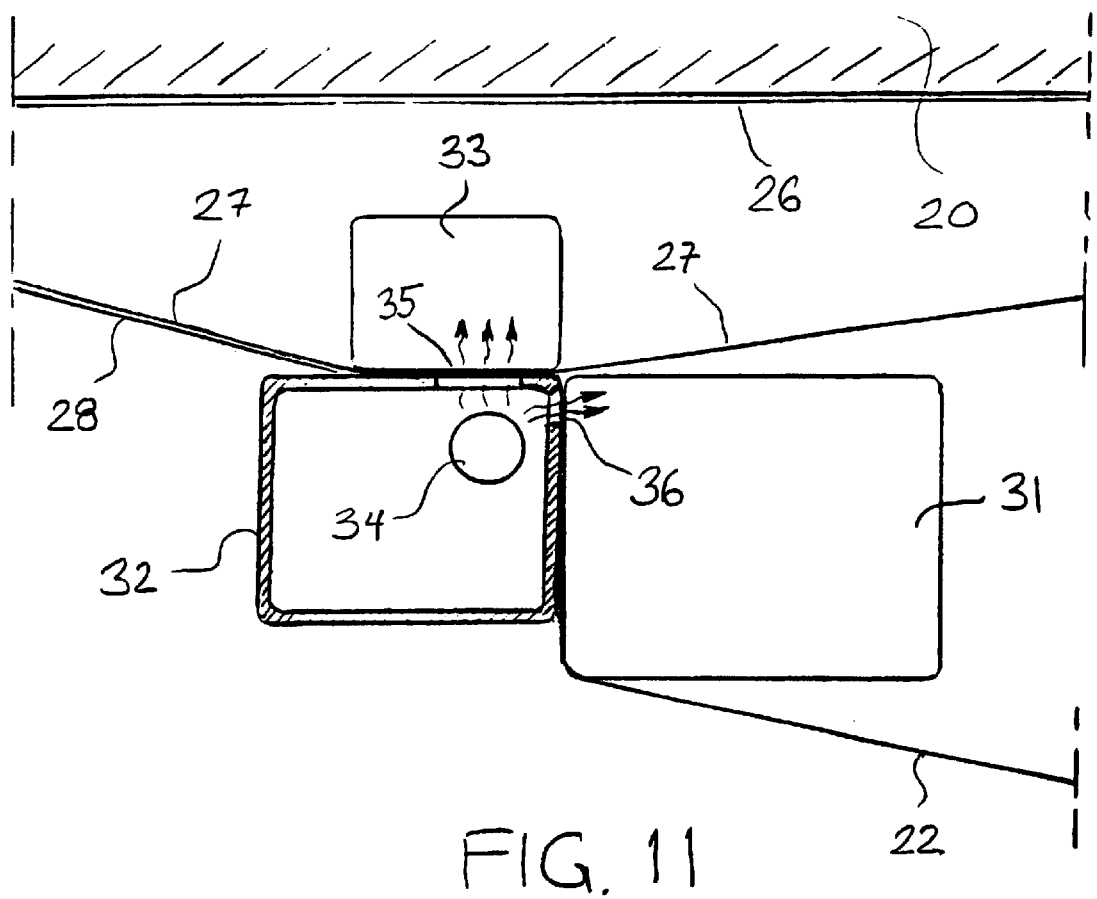
FIG. 11 shows a detail of FIG. 10.

FIG. 11 shows a detail of FIG. 10. It can be seen in the figure that at least one plastic film 22 layer has come under pressure on two sides of the gripping arm 32. In the figure, above the gripping arm 32, the first seaming layer 27 and the second seaming layer 28 are pressed against each other tightly between the seaming counterpiece 33 and the gripping arm 32. In addition, in FIG. 11, to the right of the gripping arm 32, the plastic film 22 going away from the package towards the film roll, is pressed between the gripping arm 32 and the gripping counterpiece 31.

FIG. 11 also shows that a heat radiator 34, preferably an infrared radiator, is placed inside the gripping arm 32. FIG. 11 further shows that a seaming aperture 35 is formed in the gripping arm 32 wall on the side of the seaming counterpiece 33, and a Cutting aperture 36 is formed in the gripping arm 32 wall on the side of the gripping counterpiece 31. These apertures 35 and 36 are elongated grooves which are located transversely with respect to both the plastic film layers 27 and 28 to be seamed and the plastic film web 22 to be cut. The purpose of the apertures 35 and 36 is to allow the passage of heat radiation towards both the seaming counterpiece 33 and the gripping counterpiece 31. Of these apertures, at least the cutting aperture 36 should preferably be long enough to extend right across the plastic film web 22, thus ensuring the cutting off of the web.

Seaming and cutting are started by switching on the infrared radiator 34, which acts as the heat radiator. The heat radiator then radiates heat which is able to pass through the apertures made on two sides of the gripping arm 32 towards both the seaming counterpiece 33 and the gripping counterpiece 31.

It is known that the electromagnetic rays of the infrared radiator 34 will heat any material coming in the way of the radiation the more efficiently, the better the radiation is absorbed by the material in question. The absorbency of the usually transparent PE plastic film used as packaging material depends, among other things, on the quality, thickness and pretensioning of the plastic film. In general it may, however, be said that plastic film does not absorb heat rays very well. Consequently, the infrared radiator cannot as such be used very effectively for heating plastic film. The device would be slow and inefficient.

In the packaging machine relating to the invention, the seaming and cutting of the film has been made efficient by heating at least one counterpiece on the opposite side of the plastic film web by means of the infrared heat radiator. The heating of the plastic film thus takes place mainly by using indirectly conducted heat. When the infrared heat radiator is in operation, the one or more plastic film layers between the radiator and the counterpiece heat up correspondingly. In order to adjust the temperatures required for seaming and/or cutting to a suitable level, different types of surface materials, different colours and various shades of darkness, among other things, can be used in the counterpieces. These alternatives determine the wavelength of the radiation that is absorbed by the plastic film and/or counterpiece.

According to the invention, the surface material used for the seaming counterpiece 33is, for example, acidified PTFE plastic. By means of acidification the normally white surface of this plastic is made darker, for example grey or brown. The surface will then absorb the heat rays from the infrared radiator 34 to such an extent that it can be heated to the temperature required for seaming, approximately 100° C., in about one second. This thermal energy passes almost immediately to the plastic film layers 27 and 28 to be seamed, which are between the seaming counterpiece 33 and the gripping arm 32, and are then melted, at least partly, and welded together. In this example, there are only two plastic film layers to be seamed, but there may equally well be more, depending on the properties of the package desired.

Similarly, the surface material of the cutting counterpiece 31 is selected such that it heats up as efficiently as possible. A more significant property than the choice of material of the cutting counterpiece 31 is, however, its colour. Therefore, according to one advantageous embodiment, the said surface is painted black, which means that it will absorb radiation almost completely. The infrared radiation absorbed by the black surface of the cutting counterpiece 31 does in fact heat the surface up to several hundred degrees within about one second. As a result, this thermal energy is conducted to the plastic film 22 between the cutting counterpiece 31 and the gripping arm 32, which immediately melts the film and cuts it off.

Since the infrared heat radiator 34 inside the gripping arm 32 heats up simultaneously both the seaming counterpiece 33, through the aperture 35, and the gripping counterpiece, 31, through the aperture 36, the seaming of the seaming film layers 27 and 28 and the cutting of the plastic film web 22 take place almost simultaneously. This manner of operation makes the packaging device relating to the invention substantially more efficient and simpler than known devices. This also has considerable significance for the operating speed of the packaging device.

Subsequent to the seaming of the seaming film layers 27 and 28 and the cutting of the plastic film web 22 going to the film roll, the operation of the packaging machine continues automatically so that the seaming counterpiece 33 or the separate seaming surface belonging to it is moved away from the gripping arm 32. The seaming films 27 and 28 will then be released from the pressure exerted on it by the gripping counterpiece 32 and the seaming counterpiece 33, thus detaching the entire gripping unit from the object to be packaged. The seaming counterpiece 33 is now ready to be lifted away from between the film layers.

Figure 12:
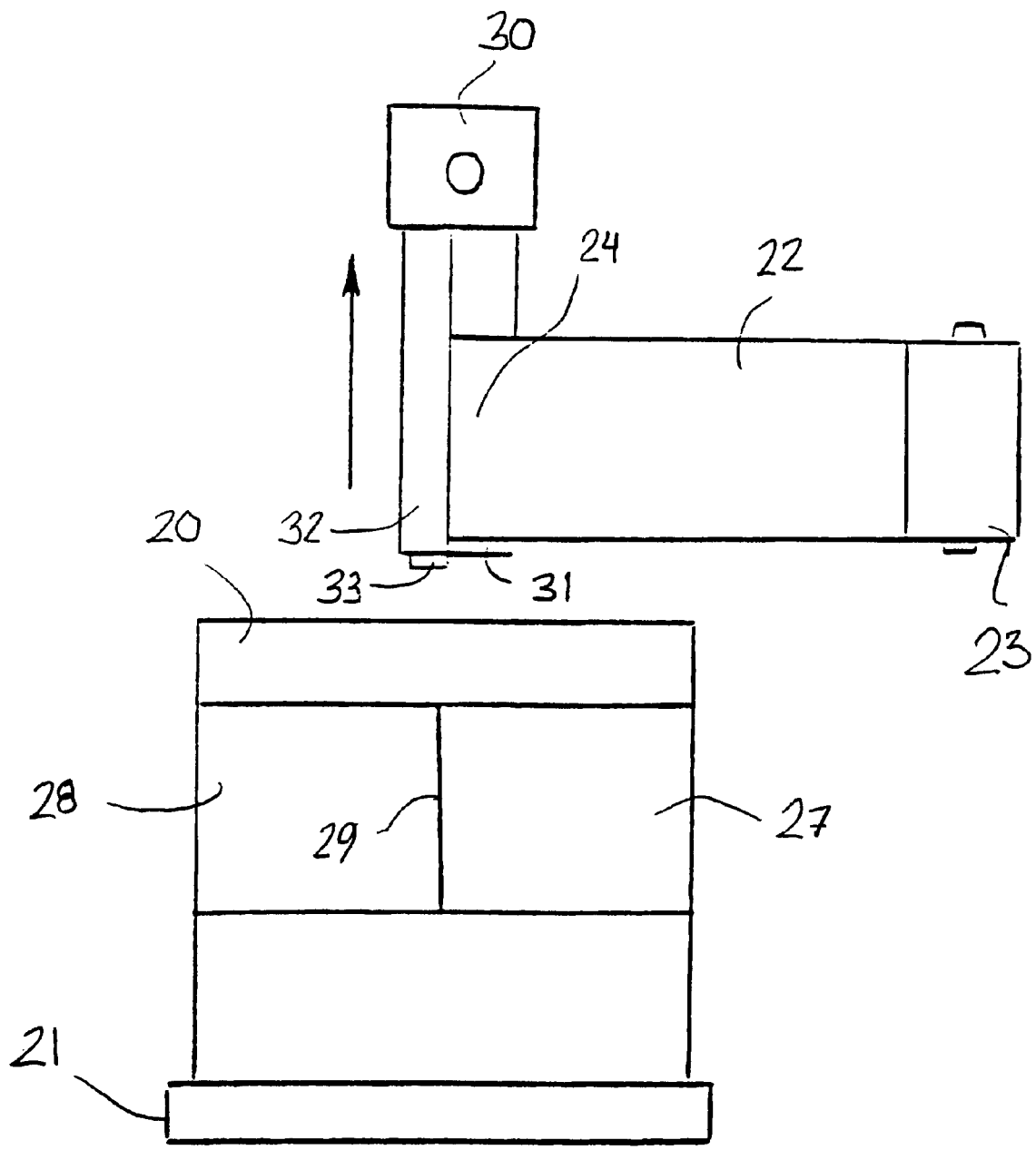
FIG. 12 corresponds to FIG. 1 at the finishing off stage of packaging.

The lifting of the seaming counterpiece 33 is carried out by lifting the entire gripping unit 30 upwards, as shown in FIG. 12. The packaging of the object 20 is then finally completed so that it is wrapped in the desired manner in the plastic film 22 taken from the film roll 23. FIG. 12 shows highlighted the topmost plastic film layers, that is, the first seaming layer 27 and the second seaming layer 28. Between them is shown the seam 29 which finishes off the packaging.

Once the object 20 has been packaged, the gripping arm 32, gripping counterpiece 31 and seaming counterpiece 33 of the gripping unit 30 are turned upwards, to their starting position shown in FIG. 1. The cut, free end 24 of the plastic film web 22 unwinding from the film roll 23 is still pressed between the gripping arm 32 and gripping counterpiece 31. This enables the packaging of the next object by wrapping to be started automatically, as described above.

Figure 13:
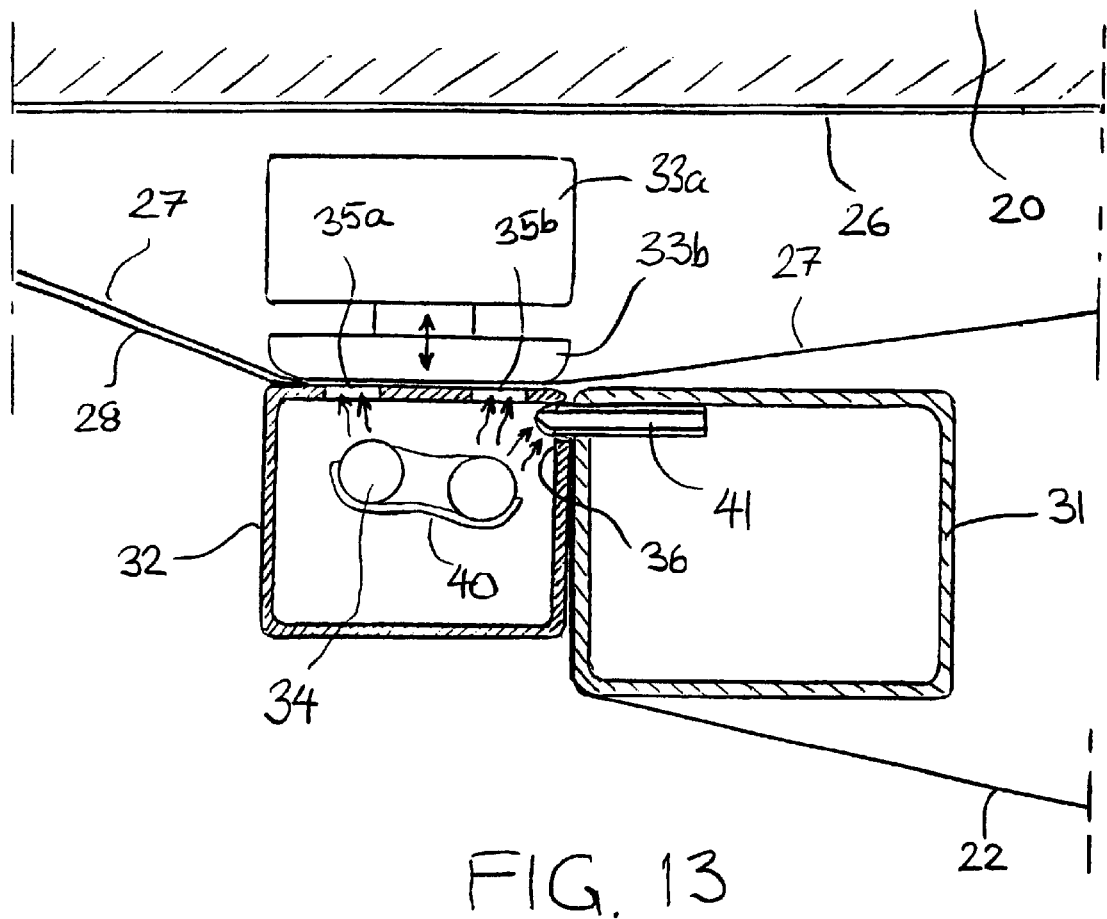
FIG. 13 corresponds to FIG. 11 and shows a second embodiment of the plastic film wrapping machine.

FIG. 13 shows another embodiment of the plastic film wrapping machine, in which the infrared heat radiator 34 inside the gripping arm 32 has two parts. The rear surface of the infrared heat radiator 34 has, for example, a gilt reflector 40, which means that the heat radiation is effectively directed towards the apertures 35 and 36 of the gripping arm 32. In the wall of the gripping arm 32 two overlapping rows of apertures 35a and 35b are formed. This ensures that the plastic film webs 27 and 28 between the gripping arm 32 and the seaming counterpiece 33 are seamed together at apertures 35a and 35b, but cannot be cut off at this point. The apertures 35a and 35b in the wall of the gripping arm 32 are shown in greater detail in FIG. 15.

Opposite the apertures 35a and 35b, the seaming counterpiece 33 located against the gripping arm 32 is also formed of two parts. A moving counterpiece 33b, made of, for example, brown bakelite, is connected to the frame part 33a of the seaming counterpiece 33. In the embodiment shown in FIG. 13, a cutting claw 41 is also connected to the gripping counterpiece 31, the point of which claw penetrates into the cutting aperture 36 of the gripping arm 32 at the cutting stage. This ensures that the cuffing surface of the cutting claw 41 comes sufficiently close to the infrared heat radiator 34 and heats up to a sufficient temperature. The structure of this detail is shown more closely in FIG. 14.

Figure 14:
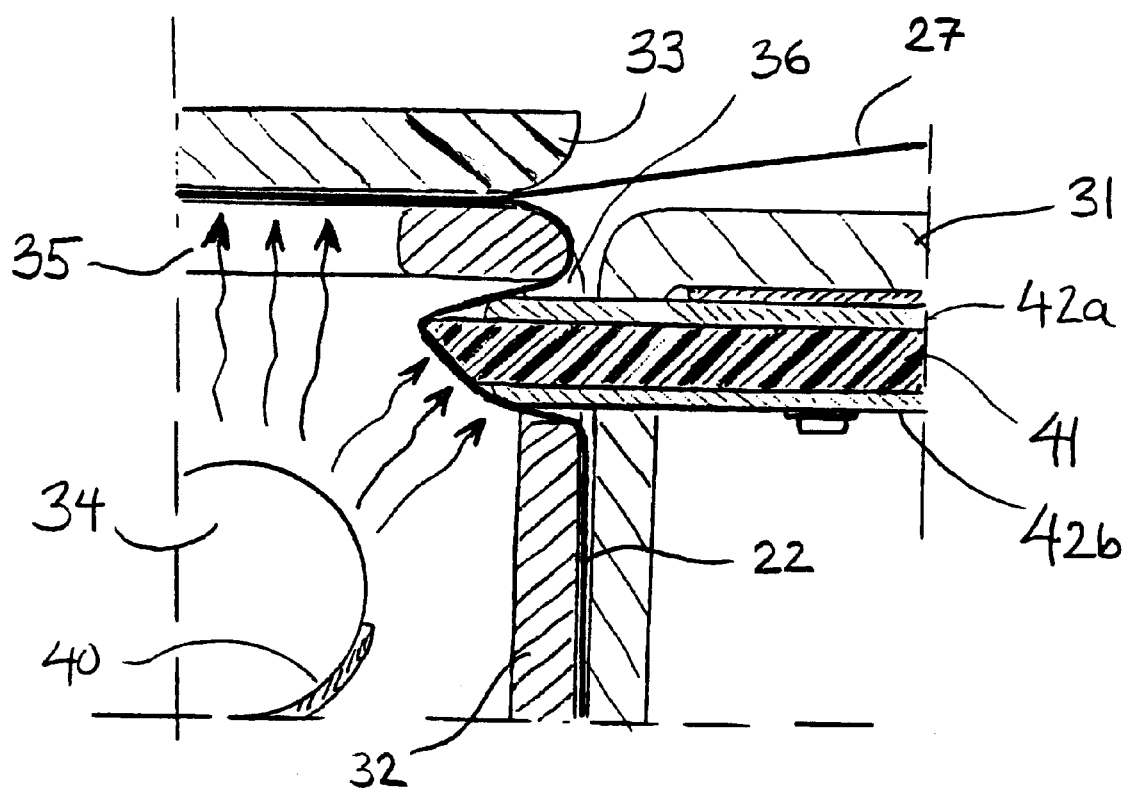
FIG. 14 shows a detail of FIG. 13.

FIG. 14 shows the operation of the cutting claw 41 of the gripping counterpiece 31. A cutting claw 41 made, for example, of matt black carbon alloyed TEFLON™ heats up to such an extent through the radiation from the infrared heat radiator 34 that the plastic film web 22 winding around the point of the cutting claw 41 is cut off almost immediately. Heating is further intensified by shiny plates 42a and 42b made, for example, of stainless steel and positioned on either side of the cutting claw 41.

Figure 15:
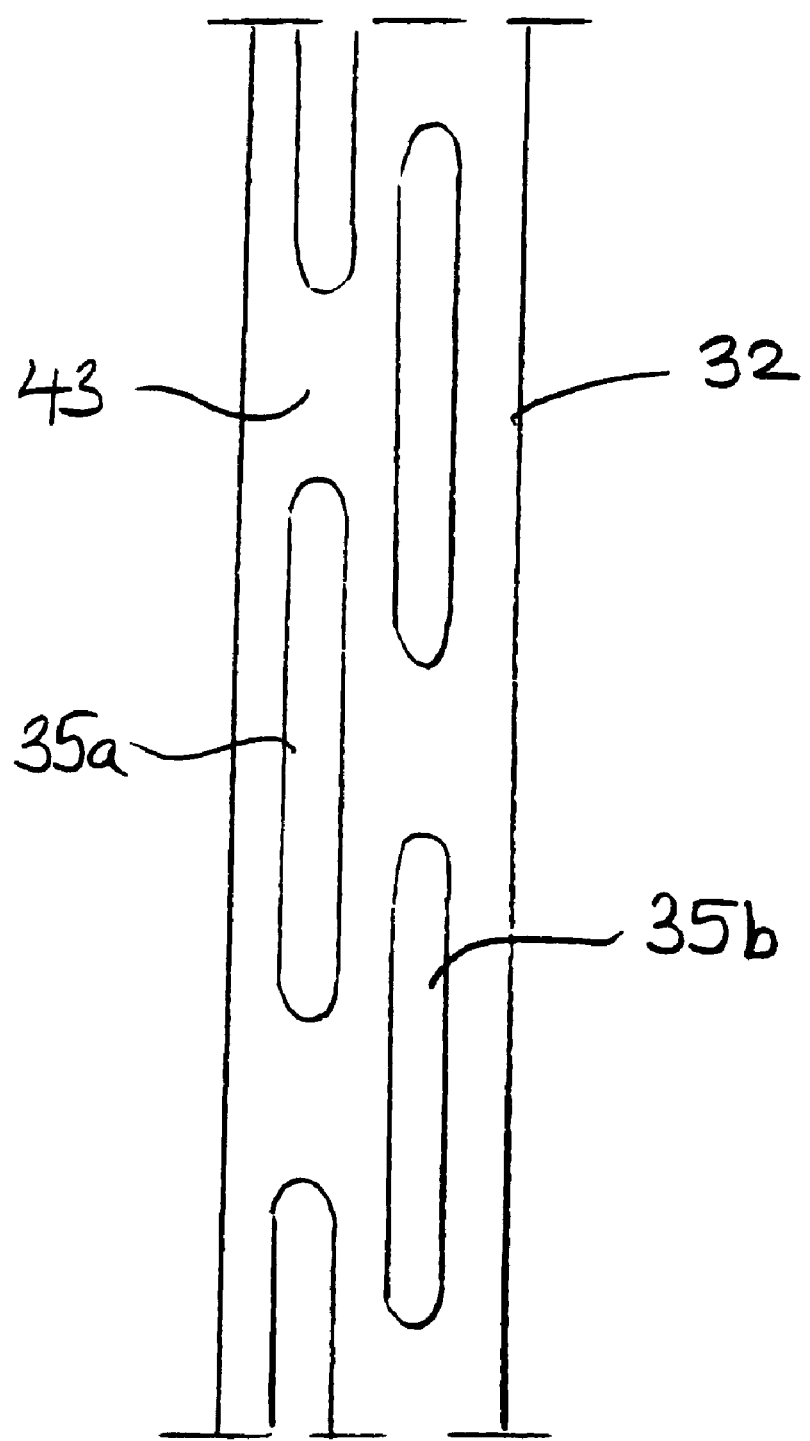
FIG. 15 shows the gripping arm of the plastic film wrapping machine, as seen from the side.

FIG. 15 shows the gripping arm 32 of the plastic film wrapping machine of FIG. 13, as seen from the side. It can be seen in the figure that the aperture rows 35a and 36b are positioned so as to overlap. This arrangement is a precaution to prevent the plastic film webs situated against the gripping arm 32 from being cut by possible overheating. This is due to the necks 43 in the rows of apertures at which points the plastic film webs do not heat up in the same way as at the apertures 35a and 35b.

It is obvious to a person skilled in the art that the different embodiments of the invention may vary within the scope of the claims presented below. The invention is also not limited to the embodiments disclosed herein. An alternative solution may be, for example, that both the seaming counterpiece and the cutting counterpiece have separate heat radiators.

What is claimed is:

1. A method for treating a plastic film used to wrap an object in a wrapping machine, comprising:
    wrapping a plastic film web around the object at least one time to form an overlapping portion of the plastic film web and a non-overlapped end portion of the plastic film web;
    placing a seaming heat-absorbent counterpiece under said overlapping portion of the plastic film web;
    pressing said seaming heat-absorbent counterpiece against said overlapping portion of the plastic film web;
    heating said seaming heat-absorbent counterpiece through said overlapping portion of the plastic film web by means of a heat radiating means;
    and absorbing heat with said seaming heat-absorbent counterpiece from the heat radiating means to heat and seam said overlapping portion of the plastic film web.

2. The method for treating a plastic film as claimed in claim 1, wherein said plastic film web is wrapped around the object two or more times.

3. The method for treating a plastic film as claimed in claim 1, wherein said seaming heat-absorbent counterpiece has a color and degree of darkness arranged to absorb heat to a temperature required to heat and bond layers of the plastic film web at said overlapping portion of the plastic film web.

4. The method for treating a plastic film as claimed in claim 1, wherein said heat radiating means is an infrared heat radiator.

5. A device for treating a plastic film used to wrap an object in a plastic film wrapping machine, comprising:
    wrapping means for wrapping a plastic film web around the object and forming an overlapping portion of the plastic film web and a non-overlapped end portion of the plastic film web;
    a seaming heat-absorbent counterpiece to be placed under said overlapping portion of the plastic film web;

means for pressing the seaming heat-absorbent counterpiece against said overlapping portion of the plastic film web;

a heat radiating means for heating said seaming heat-absorbent counterpiece through said overlapping portion of the plastic film web; and means for placing said at least one heat radiating means and said seaming heat-absorbent counterpiece on opposite sides of said overlapping portion of the plastic film web.

6. The device for treating a plastic film used to wrap an object in a plastic film wrapping machine of claim 5, wherein said heat radiating means is an infrared heat radiator.

7. The device for treating a plastic film used to wrap an object in a plastic film wrapping machine of claim 6, wherein said infrared heat radiator is situated inside said means for pressing the seaming heat-absorbent counterpiece against said overlapping portion of the plastic film web, and said means for pressing the seaming heat-absorbent counterpiece against said overlapping portion of the plastic film web comprises a tubular means having slots or apertures through which heat radiation is able to pass to the seaming heat-absorbent counterpiece.

8. The device for treating a plastic film used to wrap an object in a plastic film wrapping machine of claim 7, wherein said tubular means comprises at least two rows of overlapping seaming apertures.

9. The device for treating a plastic film used to wrap an object in a plastic film wrapping machine of claim 5, wherein said seaming heat-absorbent counterpiece has a color and degree of darkness arranged to absorb heat to a temperature required to heat and bond layers of the plastic film web at said overlapping portion of the plastic film web.

10. The device for treating a plastic film used to wrap an object in a plastic film wrapping machine of claim 5, wherein said seaming heat-absorbent counterpiece is made of brown bakelite.

11. A method for treating a plastic film used to wrap an object in a wrapping machine, comprising:

wrapping a plastic film web around the object at least one time to form an overlapping portion of the plastic film web and a non-overlapped end portion of the plastic film web;

placing a seaming heat-absorbent counterpiece under said overlapping portion of the plastic film web and placing a cutting heat-absorbent counterpiece under said non-overlapped end portion of the plastic film web;

pressing said seaming heat-absorbent counterpiece against said overlapping portion of the plastic film web and pressing said cutting heat-absorbent counterpiece against said non-overlapped end portion of the plastic film web;

heating said seaming heat-absorbent counterpiece through said overlapping portion of the plastic film web and heating said cutting heat-absorbent counterpiece through said non-overlapped end portion of the plastic film web by means of at least one heat radiating means;

and absorbing heat with said seaming heat-absorbent counterpiece from the at least one heat radiating means to heat and seam said overlapping portion of the plastic film web and absorbing heat with said cutting heat-absorbent counterpiece from the at least one heat radiating means to heat and cut said non-overlapped end portion of the plastic film web.

12. The method for treating a plastic film as claimed in claim 11, wherein said plastic film web is wrapped around the object two or more times.

13. The method for treating a plastic film as claimed in claim 11, wherein said seaming heat-absorbent counterpiece has a color and degree of darkness arranged to absorb from to a temperature required to heat and bond layers of the plastic film web at said overlapping portion of the plastic film web.

14. The method for treating a plastic film as claimed in claim 11, wherein said at least one heat radiating means is an infrared heat radiator.

15. The method for treating a plastic film as claimed in claim 11, wherein said at least one heat radiating means is a single infrared heat radiator and is used to heat said seaming heat-absorbent counterpiece through said overlapping portion of the plastic film web and to seam said overlapping portion and to heat said cutting heat-absorbent counterpiece through said non-overlapped end portion of the plastic film web and to cut said non-overlapped end portion.

16. The method for treating a plastic film as claimed in claim 11, wherein said at least one heat radiating means comprises a first heat radiator used to heat said seaming heat-absorbent counterpiece through said overlapping portion of the plastic film web and to seam said overlapping portion and a second heat radiator used to heat said cutting heat-absorbent counterpiece through said non-overlapped end portion of the plastic film web and to cut said non-overlapped end portion.

17. The method for treating a plastic film as claimed in claim 11, wherein said cutting heat-absorbent counterpiece has a color and degree of darkness arranged to absorb heat to a temperature required to heat and cut the plastic film web at said non-overlapped portion of the plastic film web.

18. A device for treating a plastic film used to wrap an object in a plastic film wrapping machine, comprising:

wrapping means for wrapping a plastic film web around the object and forming an overlapping portion of the plastic film web and a non-overlapped end portion of the plastic film web;

a seaming heat-absorbent counterpiece to be placed under said overlapping portion of the plastic film web and a cutting heat-absorbent counterpiece to be placed under said non-overlapped end portion of the plastic film web;

means for pressing the seaming heat-absorbent counterpiece against said overlapping portion of the plastic film web and means for pressing the cutting heat-absorbent counterpiece against said non-overlapped end portion of the plastic film web;

at least one heat radiating means for heating said seaming heat-absorbent counterpiece through said overlapping portion of the plastic film web and said cutting heat-absorbent counterpiece through said non-overlapped end portion of the plastic film web; and means for placing said at least one heat radiating means and said seaming heat-absorbent counterpiece on opposite sides of said overlapping portion of the plastic film web and for placing said at least one heat radiating means and said cutting heat-absorbent counterpiece on opposite sides of the non-overlapped end portion of the plastic film web.

19. The device for treating a plastic film used to wrap an object in a plastic film wrapping machine of claim 18, wherein said at least one heat radiating means is an infrared heat radiator.

20. The device for treating a plastic film used to wrap an object in a plastic film wrapping machine of claim 18, wherein said seaming heat-absorbent counterpiece has a color and degree of darkness arranged to absorb heat to a temperature required to heat and bond layers of the plastic film web at said overlapping portion of the plastic film web.

21. The device for treating a plastic film used to wrap an object in a plastic film wrapping machine of claim 18, wherein said cutting heat-absorbent counterpiece has a color and degree of darkness arranged to absorb heat to a temperature required to heat and cut the plastic film web at said non-overlapped portion of the plastic film web.

22. The device for treating a plastic film used to wrap an object in a plastic film wrapping machine of claim 18, wherein said at least one heat radiating means is one infrared heat radiator for heating both said seaming heat-absorbent counterpiece and said cutting heat-absorbent counterpiece.

23. The device for treating a plastic film used to wrap an object in a plastic film wrapping machine of claim 22, wherein said infrared heat radiator is situated inside said means for pressing the seaming heat-absorbent counterpiece against said overlapping portion of the plastic film web and the cutting heat-absorbent counterpiece against said non-overlapped end portion of the plastic film web, and said means for pressing the seaming heat-absorbent counterpiece against said overlapping portion of the plastic film web and the means for pressing the cutting heat-absorbent counterpiece against said non-overlapped end portion of the plastic film web comprise a tubular means having slots or apertures through which heat radiation is able to pass to both the seaming heat-absorbent counterpiece and the cutting heat-absorbent counterpiece.

24. The device for treating a plastic film used to wrap an object in a plastic film wrapping machine of claim 23, wherein said cutting heat-absorbent counterpiece comprises a cutting claw having a point for penetrating into an aperture of said tubular means so that a cutting surface of the cutting claw is in close proximity to the infrared heat radiator.

25. The device for treating a plastic film used to wrap an object in a plastic film wrapping machine of claim 24, wherein said cutting claw is made of carbon alloyed material.

26. The device for treating a plastic film used to wrap an object in a plastic film wrapping machine of claim 24, wherein reflective plates are provided on either side of said cutting claw.

27. The device for treating a plastic film used to wrap an object in a plastic film wrapping machine of claim 23, wherein said tubular means comprises a cutting aperture and at least two rows of overlapping seaming apertures.

28. The device for treating a plastic film used to wrap an object in a plastic film wrapping machine of claim 18, wherein said at least one heat radiating means comprises two infrared heat radiators and reflecting means.

29. The device for treating a plastic film used to wrap an object in a plastic film wrapping machine of claim 18, wherein said seaming heat-absorbent counterpiece is made of brown bakelite.

30. A method for treating a plastic film used to wrap an object in a wrapping machine, comprising;
wrapping a plastic film web around the object at least one time to form an overlapping portion of the plastic film web and a non-overlapped end portion of the plastic film web;
placing a cutting heat-absorbent counterpiece under said non-overlapped end portion of the plastic film web;
pressing said cutting heat-absorbent counterpiece against said non-overlapped end portion of the plastic film web
heating said cutting heat-absorbent counterpiece through said non-overlapped end portion of the plastic film web by means of a heat radiating means;
and absorbing heat with said cutting heat-absorbent counterpiece from the heat radiating means to heat and cut said non-overlapped end portion of the plastic film web.

31. The method for treating a plastic film as claimed in claim 30, wherein said plastic film web is wrapped around the object two or more times.

32. The method for treating a plastic film as claimed in claim 30, wherein said heat radiating means is an infrared heat radiator.

33. The method for treating a plastic film as claimed in claim 30, wherein said cutting heat-absorbent counterpiece has a color and degree of darkness arranged to absorb heat to a temperature required to heat and cut the plastic film web at said non-overlapped portion of the plastic film web.

34. A device for treating a plastic film used to wrap an object in a plastic film wrapping machine, comprising:
wrapping means for wrapping a plastic film web around the object and forming an overlapping portion of the plastic film web and a non-overlapped end portion of the plastic film web;
a cutting heat-absorbent counterpiece to be placed under said non-overlapped end portion of the plastic film web;
means for pressing the cutting heat-absorbent counterpiece against said non-overlapped end portion of the plastic film web;
heat radiating means for heating said cutting heat-absorbent counterpiece through said non-overlapped end portion of the plastic film web; and
means for placing said heat radiating means and said cutting heat-absorbent counterpiece on opposite sides of the non-overlapped end portion of the plastic film web.

35. The device for treating a plastic film used to wrap an object in a plastic film wrapping machine of claim 34, wherein said heat radiating means is an infrared heat radiator.

36. The device for treating a plastic film used to wrap an object in a plastic film wrapping machine of claim 34, wherein said cutting heat-absorbent counterpiece has a color and degree of darkness arranged to absorb heat to a temperature required to heat and cut the plastic film web at said non-overlapped portion of the plastic film web.

37. The device for treating a plastic film used to wrap an object in a plastic film wrapping machine of claim 34, wherein said infrared heat radiator is situated inside said means for pressing the cutting heat-absorbent counterpiece against said non-overlapped end portion of the plastic film web, and said means for pressing the cutting heat-absorbent counterpiece against said non-overlapped end portion of the plastic film web comprises a tubular means having one or more slots or apertures through which heat radiation is able to pass to the cutting heat-absorbent counterpiece.

38. The device for treating a plastic film used to wrap an object in a plastic film wrapping machine of claim 37, wherein said cutting heat-absorbent counterpiece comprises a cutting claw having a point which is capable of penetrating into an aperture of said tubular means so that a cutting surface of the cutting claw is in close proximity to the infrared heat radiator.

39. The device for treating a plastic film used to wrap an object in a plastic film wrapping machine of claim 37, wherein said tubular means comprises a cutting aperture.

40. The device for treating a plastic film used to wrap an object in a plastic film wrapping machine of claim 37, wherein said cutting claw is made of carbon alloyed material.

41. The device for treating a plastic film used to wrap an object in a plastic film wrapping machine of claim 37, wherein reflective plates are provided on either side of said cutting claw.

* * * * *